US011891044B2

(12) United States Patent
Aruga et al.

(10) Patent No.: US 11,891,044 B2
(45) Date of Patent: Feb. 6, 2024

(54) CONTROL DEVICE, CONTROL METHOD, AND ELECTRICAL VEHICLE

(71) Applicant: HONDA MOTOR CO., LTD., Tokyo (JP)

(72) Inventors: Nobuyuki Aruga, Tokyo (JP); Akio Futatsudera, Tokyo (JP); Kaiwen Tong, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 102 days.

(21) Appl. No.: 17/518,895

(22) Filed: Nov. 4, 2021

(65) Prior Publication Data

US 2022/0144246 A1 May 12, 2022

(30) Foreign Application Priority Data

Nov. 6, 2020 (JP) ................................ 2020-185887

(51) Int. Cl.
*B60W 20/12* (2016.01)
*B60W 10/08* (2006.01)
(Continued)

(52) U.S. Cl.
CPC ............ *B60W 20/12* (2016.01); *B60W 10/06* (2013.01); *B60W 10/08* (2013.01); *B60W 10/26* (2013.01);
(Continued)

(58) Field of Classification Search
CPC ...... B60W 20/12; B60W 20/20; B60W 10/06; B60W 10/08; B60W 10/26; B60W 10/02;
(Continued)

(56) References Cited

U.S. PATENT DOCUMENTS

2008/0183348 A1 7/2008 Arita et al.
2013/0124028 A1* 5/2013 Ang ...................... B60W 10/08 180/65.265
(Continued)

FOREIGN PATENT DOCUMENTS

CN 101234636 A 8/2008
CN 105857299 A 8/2016
(Continued)

OTHER PUBLICATIONS

Jun. 7, 2022, Japanese Office Action issued for related JP Application No. 2020-185887.
(Continued)

*Primary Examiner* — George C Jin

(74) *Attorney, Agent, or Firm* — Paratus Law Group, PLLC

(57) ABSTRACT

When a scheduled traveling route is changed during travelling of an electrical vehicle, a management ECU of the electrical vehicle maintains control of a travelling mode based on a travelling plan created based on the scheduled traveling route before the change, in accordance with a result of comparison between first attribute information and second attribute information, the first attribute information indicating an attribute of at least one section, which is located within a predetermined distance from a section in which the electrical vehicle is located and located in a vehicle travelling direction, of the scheduled traveling route before the change, the second attribute information indicating an attribute of at least one section, which is located within a predetermined distance from a section in which the electrical vehicle is located and located in a vehicle travelling direction, of the scheduled traveling route after the change.

7 Claims, 8 Drawing Sheets

(51) Int. Cl.
*B60W 10/26* (2006.01)
*B60W 40/105* (2012.01)
*B60W 10/06* (2006.01)

(52) U.S. Cl.
CPC ....... *B60W 40/105* (2013.01); *B60W 2556/50* (2020.02)

(58) Field of Classification Search
CPC ........... B60W 40/105; B60W 2556/50; B60W 2554/406; B60W 2555/60; B60W 2556/45; B60W 2710/248
See application file for complete search history.

(56) References Cited

U.S. PATENT DOCUMENTS

| | | | | |
|---|---|---|---|---|
| 2016/0231123 | A1 | 8/2016 | Morisaki | |
| 2018/0312158 | A1 | 11/2018 | Morimoto et al. | |
| 2019/0106108 | A1* | 4/2019 | Wienecke | B60R 11/04 |

FOREIGN PATENT DOCUMENTS

| | | | |
|---|---|---|---|
| JP | 2008-184077 | A | 8/2008 |
| JP | 2016-141361 | A | 8/2016 |
| JP | 2019-137174 | A | 8/2019 |
| KR | 10-2018-0124562 | A | 11/2018 |
| KR | 101945103 | B1 * | 2/2019 |
| WO | WO 2017/098799 | A1 | 6/2017 |

OTHER PUBLICATIONS

Sep. 29, 2023, translation of Chinese Office Action issued for related CN Application No. 202111302889.5.

* cited by examiner

CONTROL DEVICE, CONTROL METHOD, AND ELECTRICAL VEHICLE

CROSS-REFERENCE TO RELATED APPLICATIONS

The present application claims the benefit of priority of Japanese Patent Application No. 2020-185887, filed on Nov. 6, 2020, the content of which is incorporated herein by reference.

TECHNICAL FIELD

The present invention relates to a control device and a control method that control travelling by creating a travelling plan, and an electrical vehicle.

BACKGROUND ART

In the related art, a hybrid vehicle has been known, which includes an internal combustion engine, an electric motor, and a storage battery that can be charged with electric power, which is generated by the electric motor (generator) using power of the internal combustion engine, or external electric power. Such a hybrid vehicle can travel in various travelling modes. Examples of the traveling mode include an EV mode in which a vehicle travels only by an output of an electric motor that is driven by electric power of a storage battery after an internal combustion engine is stopped, and a series mode in which a vehicle travels by an output of an electric motor that is driven by the supply of electric power generated by a generator using power of an internal combustion engine.

These traveling modes are selected and switched in accordance with various situations. For example, JP-A-2016-141361 has proposed to forcibly set a traveling mode of an own vehicle to a CD mode in which electric power of a storage battery is consumed when the own vehicle deviates from a traveling route created in a traveling plan.

SUMMARY OF INVENTION

When a navigation system detects a more suitable travelling route even while a vehicle is traveling on a scheduled traveling route determined based on a destination input by a user, the navigation system may change the scheduled traveling route. When there is a change in the scheduled traveling route, it may be determined that the vehicle has deviated from the scheduled traveling route even if the changed route is far from a current position and the vehicle is currently traveling along the scheduled traveling route.

In such a case, for example, the traveling mode of the vehicle is forcibly shifted to the CD mode in the configuration of Patent Literature 1, and thus, there is a problem in that the electric power of the storage battery may be excessively consumed, or the operation of the internal combustion engine may be suddenly changed, giving a sense of discomfort to an occupant. When it is determined that the vehicle has deviated from the scheduled traveling route, a new scheduled traveling route is set, and an appropriate travelling plan based on the new scheduled traveling route can be re-created. However, the problem becomes noticeable when it takes time to acquire the new scheduled traveling route after the vehicle deviates from the scheduled traveling route.

The present invention provides a control device, a control method, and an electric vehicle, by which electric power consumption of a storage battery can be prevented, and a sense of discomfort of an occupant can be prevented.

The present embodiment provides a control device for an electrical vehicle that includes an internal combustion engine, a storage battery, and an electric motor driven by supply of electric power from the storage battery, and travels in a plurality of traveling modes in which the usage amounts of electric power of the storage battery are different, the control device comprising a control unit configured to create a travelling plan in which any one of the plurality of travelling modes is assigned to each traveling section of a scheduled traveling route from a current position of the electrical vehicle to a destination, and controls the travelling mode of the electrical vehicle based on the created travelling plan, wherein, when the scheduled traveling route is changed during travelling of the electrical vehicle, the control unit maintains control of the travelling mode based on the travelling plan created based on the scheduled traveling route before the change, in accordance with a result of comparison between first attribute information and second attribute information, the first attribute information indicating an attribute of at least one section, which is located within a predetermined distance from a section in which the electrical vehicle is located and located in a vehicle travelling direction, of the scheduled traveling route before the change, the second attribute information indicating an attribute of at least one section, which is located within a predetermined distance from a section in which the electrical vehicle is located and located in a vehicle travelling direction, of the scheduled traveling route after the change.

The present embodiment also provides a control method for an electrical vehicle that includes an internal combustion engine, a storage battery, and an electric motor driven by supply of electric power from the storage battery, and travels in a plurality of traveling modes in which the usage amounts of electric power of the storage battery are different, the control method comprising a control step of creating a travelling plan in which any one of the plurality of travelling modes is assigned to each traveling section of a scheduled traveling route from a current position of the electrical vehicle to a destination, and controlling the travelling mode of the electrical vehicle based on the created travelling plan, wherein, when the scheduled traveling route is changed during travelling of the electrical vehicle, control of the travelling mode based on the travelling plan created based on the scheduled traveling route before the change is maintained in the control step in accordance with a result of comparison between first attribute information and second attribute information, the first attribute information indicating an attribute of at least one section, which is located within a predetermined distance from a section in which the electrical vehicle is located and located in a vehicle travelling direction, of the scheduled traveling route before the change, the second attribute information indicating an attribute of at least one section, which is located within a predetermined distance from a section in which the electrical vehicle is located and located in a vehicle travelling direction, of the scheduled traveling route after the change.

The present embodiment also provides an electrical vehicle, which includes an internal combustion engine, a storage battery, and an electric motor driven by supply of electric power from the storage battery, and travels in a plurality of traveling modes in which the usage amounts of electric power of the storage battery are different, the electrical vehicle comprising a control unit configured to create a travelling plan in which any one of the plurality of travelling modes is assigned to each traveling section of a scheduled traveling route from a current position of the electrical vehicle to a destination, and controls the travelling mode of the electrical vehicle based on the created travelling plan, wherein, when the scheduled traveling route is changed during travelling of the electrical vehicle, the control unit maintains control of the travelling mode based on the travelling plan created based on the scheduled traveling route before the change, in accordance with a result of comparison between first attribute information and second attribute information, the first attribute information indicating an attribute of at least one section, which is located within a predetermined distance from a section in which the electrical vehicle is located and located in a vehicle travelling direction, of the scheduled traveling route before the change, the second attribute information indicating an attribute of at least one section, which is located within a predetermined distance from a section in which the electrical vehicle is located and located in a vehicle travelling direction, of the scheduled traveling route after the change.

According to the present invention, the electric power consumption of a storage battery can be prevented, and a sense of discomfort of an occupant can be prevented.

DESCRIPTION OF EMBODIMENTS

Figure 1:
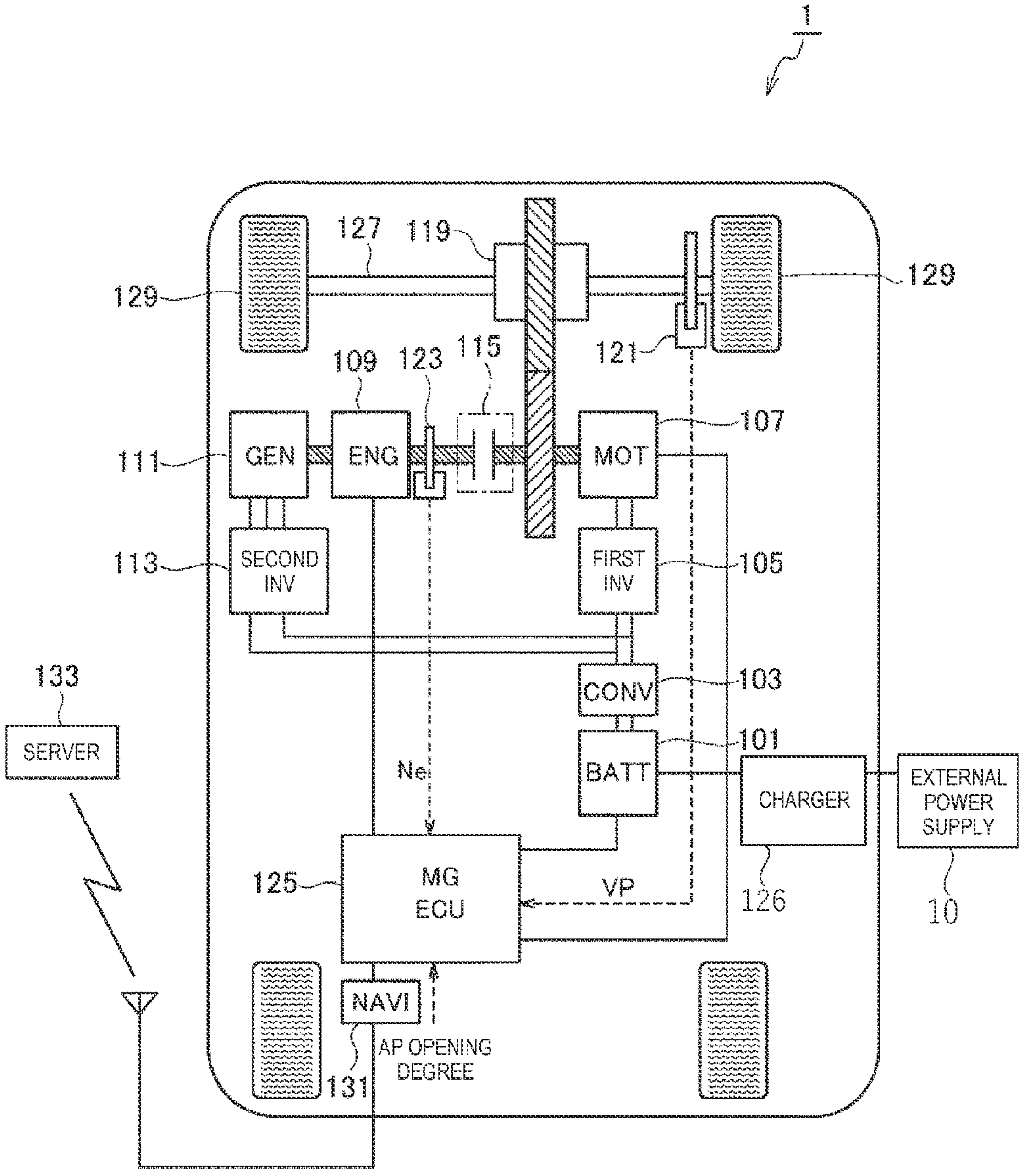
FIG. 1 is a block diagram showing an internal configuration of a series/parallel type plug-in hybrid electrical vehicle.

Hereinafter, an embodiment of the present invention will be described with reference to the drawings.

A hybrid electrical vehicle includes an electric motor and an internal combustion engine and travels by a driving force of the electric motor and/or the internal combustion engine in accordance with a traveling state of the vehicle. There are roughly two types of hybrid electrical vehicles, that is, a series type hybrid electrical vehicle and a parallel type hybrid electrical vehicle. A series type hybrid electrical vehicle travels by power of an electric motor. The internal combustion engine is used only for power generation, and electric power generated by a generator with the power of the internal combustion engine is transmitted to a storage battery or supplied to an electric motor.

Examples of the travelling mode of the series type hybrid electrical vehicle first include a travelling mode in which the hybrid electrical vehicle travels by a driving force of an electric motor driven by the supply of electric power from a storage battery. In this case, the internal combustion engine is not driven. Examples of the travelling mode of the series type hybrid electrical vehicle further include a traveling mode in which the hybrid electrical vehicle travels by a driving force of an electric motor driven by the supply of electric power from both the storage battery and the generator, or the supply of electric power from only the generator. In this case, the internal combustion engine is driven for power generation in the generator.

A parallel type hybrid electrical vehicle travels by a driving force of either one or both of an electric motor and an internal combustion engine. Examples of a traveling mode of the parallel type hybrid electrical vehicle particularly include a mode in which the hybrid electrical vehicle travels by a driving force of only the internal combustion engine.

A series/parallel type hybrid electrical vehicle in which a series type and a parallel type are combined is also known. In the series/parallel type, a transmission system of a driving force is switched to a configuration of either one of the series type and the parallel type by releasing or engaging (disconnecting or connecting) a clutch in accordance with a traveling state of the vehicle. In particular, a configuration of the series type is achieved by releasing the clutch during acceleration traveling at a low and medium speed, and a configuration of the parallel type is achieved by engaging the clutch during steady traveling (cruise traveling) at a medium and high speed.

A plug-in hybrid electrical vehicle obtained by adding an external charging function to a hybrid electrical vehicle is also known. The plug-in hybrid electrical vehicle is equipped with a battery having a capacity larger than that of a normal hybrid electrical vehicle, and can be charged with electric power supplied directly from a household power supply using a plug. Therefore, the plug-in hybrid electrical vehicle can travel a longer distance with electricity alone.

<Internal Configuration of Series/Parallel Type Plug-In Hybrid Electrical Vehicle>

As shown in FIG. 1, a series/parallel type plug-in hybrid electrical vehicle (hereinafter, simply referred to as "electrical vehicle") 1 includes a storage battery (BATT) 101, a converter (CONV) 103, a first inverter (first INV) 105, an electric motor (MOT) 107, an internal combustion engine (ENG) 109, a generator (GEN) 111, a second inverter (second INV) 113, an engine direct connection clutch (hereinafter, simply referred to as "clutch") 115, a gearbox (hereinafter, simply referred to as "gear") 119, a vehicle speed sensor 121, a rotation speed sensor 123, a management ECU (MG ECU) 125, a charger 126, and a navigation system (NAVI) 131 that acquires information from a server 133. In FIG. 1, an arrow of a dotted line indicates value data, and a solid line indicates a control signal including an instruction content. The control device of the present invention can be applied to, for example, the management ECU 125.

The storage battery 101 includes a plurality of power storage cells connected in series, and supplies a high voltage of, for example, 100 to 200 [V]. The power storage cell is, for example, a lithium-ion battery or a nickel-metal hydride battery. The converter 103 steps up or steps down a DC output voltage of the storage battery 101 in the DC form. The first inverter 105 converts the DC voltage from the converter 103 into an AC voltage and supplies a three-phase current to the electric motor 107. In addition, the first inverter 105 converts an AC voltage received during a regenerative operation of the electric motor 107 into a DC voltage and charges the storage battery 101.

The charger 126 can be connected to an external power supply 10 via a plug, and can charge the storage battery 101 with electric power of the external power supply 10. For example, the charger 126 includes an inverter that converts an AC voltage of the external power supply 10 into a DC voltage. The external power supply 10 is, for example, a household power supply.

The electric motor 107 generates power for an electrical vehicle 1 to travel. A torque generated by the electric motor 107 is transmitted to a drive shaft 127 via a gear 119. A rotor of the electric motor 107 is directly connected to the gear 119. The electric motor 107 operates as a generator at the time of regenerative braking, and the electric power generated by the electric motor 107 is transmitted to the storage battery 101.

The internal combustion engine 109 is used only for driving the generator 111 when a clutch 115 is released and the electrical vehicle 1 travels in a series manner. However, when the clutch 115 is engaged, an output of the internal combustion engine 109 is transmitted to the drive shaft 127 via the clutch 115 and the gear 119 as mechanical energy for the electrical vehicle 1 to travel.

The generator 111 is driven by power of the internal combustion engine 109 to generate electric power. The electric power generated by the generator 111 is transmitted to the storage battery 101, or supplied to the electric motor 107 via the second inverter 113 and the first inverter 105. The second inverter 113 converts an AC voltage generated by the generator 111 into a DC voltage. The electric power converted by the second inverter 113 is transmitted to the storage battery 101, or supplied to the electric motor 107 via the first inverter 105.

The clutch 115 disconnects and connects a transmission path of a driving force from the internal combustion engine 109 to driving wheels 129 based on an instruction from the management ECU 125.

The gear 119 is, for example, a one-stage fixed gear corresponding to the fifth gear. Therefore, the gear 119 converts a driving force from the electric motor 107 into a rotation speed and a torque at a specific transmission gear ratio, and transmits the rotation speed and the torque to the drive shaft 127. The vehicle speed sensor 121 detects a traveling speed (vehicle speed VP) of the electrical vehicle 1. A signal indicating the vehicle speed VP detected by the vehicle speed sensor 121 is sent to the management ECU 125. The rotation speed sensor 123 detects a rotation speed Ne of the internal combustion engine 109. A signal indicating the rotation speed Ne detected by the rotation speed sensor 123 is sent to the management ECU 125.

The management ECU 125 is an electronic control unit (ECU) that performs calculation of a rotation speed of the electric motor 107 based on the vehicle speed VP, connection and disconnection of the clutch 115, detection of the state of charge (SOC) of the storage battery 101, detection of the accelerator pedal opening degree (AP opening degree), switching of the traveling mode, control of the electric motor 107, the internal combustion engine 109, and the generator 111, and the like. The management ECU 125 is an example of a control unit of the present invention.

The navigation system 131 has a communication function and acquires information from the server 133. In the server 133, traveling section information of roads, vehicle speed information of other vehicles corresponding to each piece of traveling section information, and the like are accumulated. In addition, gradient information of the road corresponding to each piece of traveling section information is accumulated in the server 133. The navigation system 131 acquires required information from the server 133 in accordance with a destination input by a user via an input unit (not shown), sets a scheduled traveling route from a current position to a destination, and sends the scheduled traveling route to the management ECU 125.

<Driving State According to Each Travelling Mode of Electrical Vehicle 1 Shown in FIG. 1>

Figure 2:
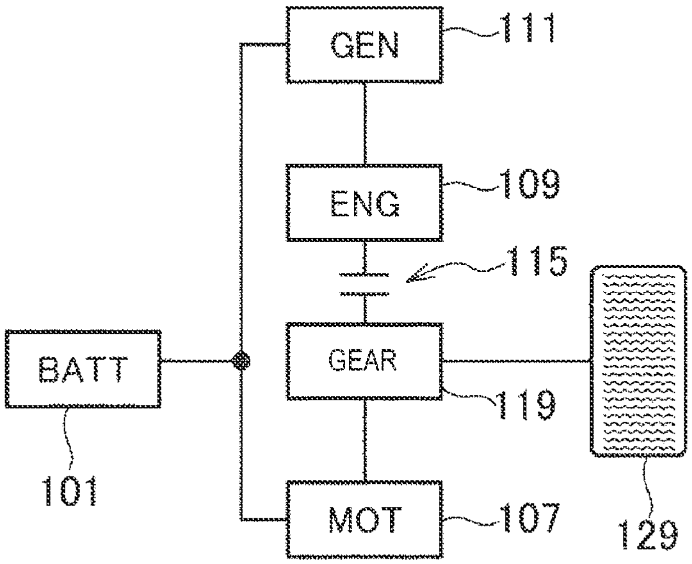
FIG. 2 is a diagram schematically showing a main part of a drive system in the electrical vehicle shown in FIG. 1.

FIG. 2 schematically shows a main part of a drive system in the electrical vehicle 1 shown in FIG. 1.

Figure 3A:
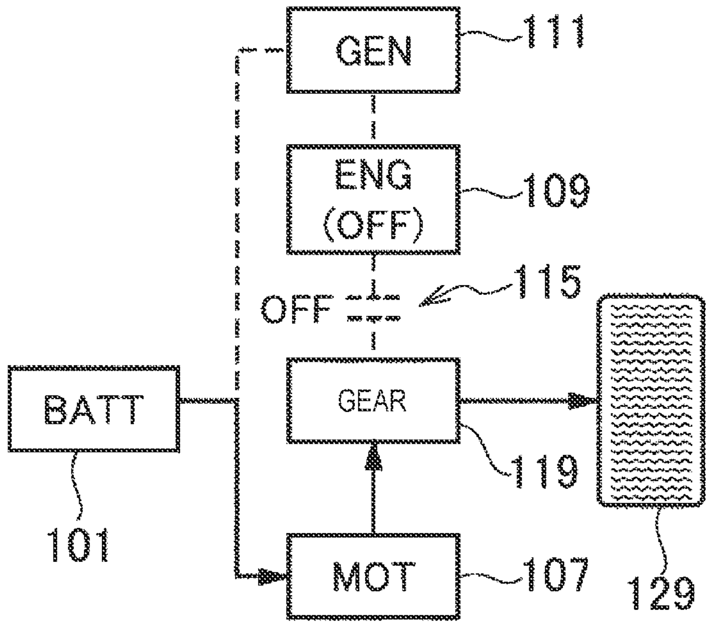
FIG. 3A is a diagram showing a driving state of the electrical vehicle shown in FIG. 1 in an EV mode.

First, as shown in FIG. 3A, the electrical vehicle 1 can travel by a driving force of the electric motor 107 that is driven by the supply of electric power from the storage battery 101, with the clutch 115 released and the internal combustion engine 109 stopped (EV mode).

Figure 3B:
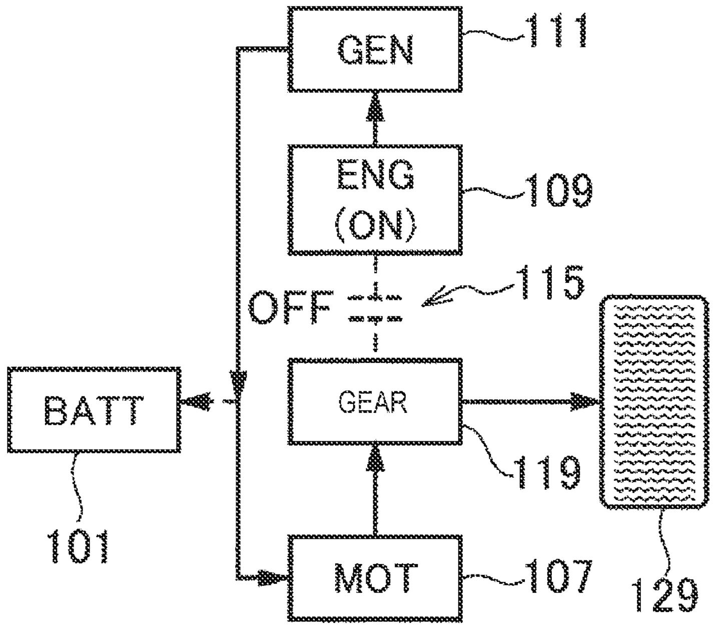
FIG. 3B is a diagram showing a driving state of the electrical vehicle shown in FIG. 1 in a first series mode.

The electrical vehicle 1 can also travel by a driving force of the electric motor 107 that is driven by the supply of electric power generated by the generator 111 with power of the internal combustion engine 109 while releasing the clutch 115 (series mode). As shown in FIG. 3B, examples of this traveling mode include a mode in which the power of the internal combustion engine 10) causes the generator 111 to generate only electric power that allows the electric motor 107 to output a required output based on the accelerator pedal opening degree, the vehicle speed, and the like. At this time, charging and discharging in the storage battery 101 are not performed in principle.

Figure 3C:
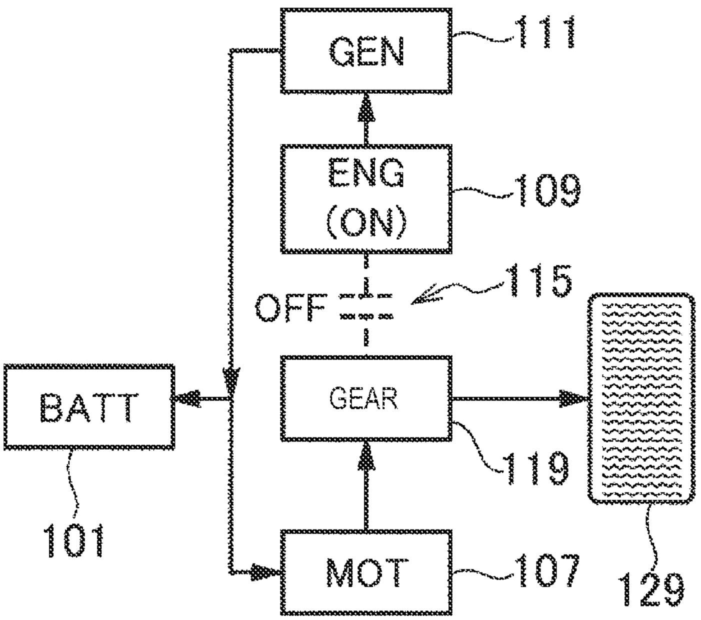
FIG. 3C is a diagram showing a driving state of the electrical vehicle shown in FIG. 1 in a second series mode.

Further, as shown in FIG. 3C, there is a mode in which the power of the internal combustion engine 109 causes the generator 111 to generate not only the electric power that allows the electric motor 107 to output a required output based on the accelerator pedal opening degree, the vehicle speed, and the like but also electric power with which the storage battery 101 can be charged. Although not shown, when the required output is large, it is also possible to supply the electric power from the storage battery 101 to the electric motor 107 as assist electric power.

Figure 3D:
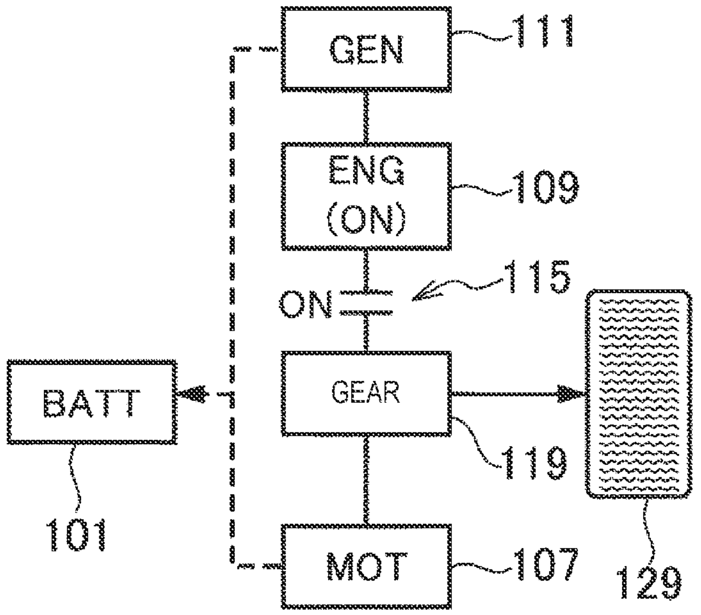
FIG. 3D is a diagram showing a driving state of the electrical vehicle shown in FIG. 1 in an engine direct connection mode.

Further, as shown in FIG. 3D, the electrical vehicle 1 can also travel by a driving force of the internal combustion engine 109 by engaging the clutch 115 (engine direct connection mode). Also in the engine direct connection mode, when the required output is large, it is possible to use the driving force of the electric motor 107 driven by the supply of electric power from the storage battery 101, in addition to the driving force of the internal combustion engine 109.

As described above, the storage battery 101 of the electrical vehicle 1 can be charged with external electric power. Therefore, if a charging environment is provided at the destination, the storage battery 101 can be charged with external electric power via the charger 126. In order to efficiently use the external electric power by increasing the amount of charge at this time, it is necessary to sufficiently lower the SOC of the storage battery 101 at the time point of arriving at the destination. Therefore, the management ECU 125 perform control such that the electrical vehicle 1 is caused to travel from the current position in the EV mode to sufficiently reduce the SOC of the storage battery 101, and then the internal combustion engine 109 is driven to cause the electrical vehicle 1 to travel in the series mode or the engine direct connection mode.

The navigation system 131 sets a scheduled traveling route from the current position to the destination in accordance with the input of the destination from the user. In this case, the navigation system 131 acquires information on roads constituting the scheduled traveling route from the server 133. The information on roads accumulated in the server 133 includes a road gradient, road types such as expressways, toll roads, and general roads, legal speed limits thereof, and the like. Therefore, the navigation system 131 can predict a point at which high-speed traveling is required in accordance with the setting of the scheduled traveling route.

In the information on road acquired from the server 133 in accordance with the input of the destination from the user, the scheduled traveling route is divided into a plurality of traveling sections. A delimiter of the traveling section is provided at a boundary of the road types or a destination or a transit point received by the navigation system 131, and is provided such that a distance of the traveling section is equal to or less than a predetermined value at the maximum. Information, such as the road type, an average vehicle speed, a distance, and a gradient, of each traveling section constituting the scheduled traveling route is received by the navigation system 131. These pieces of information can also be acquired by the management ECU 125 via, for example, the navigation system 131.

The average vehicle speed in each traveling section is obtained, for example, as an average value of legal speed limits from a start point to an end point of one section. Alternatively, the average vehicle speed in each traveling section may be obtained as an average value of vehicle speeds of other vehicles corresponding to each traveling section.

<Average Vehicle Speed and Average Gradient Acquired by Management ECU Shown in FIG. 1>

Figure 4:
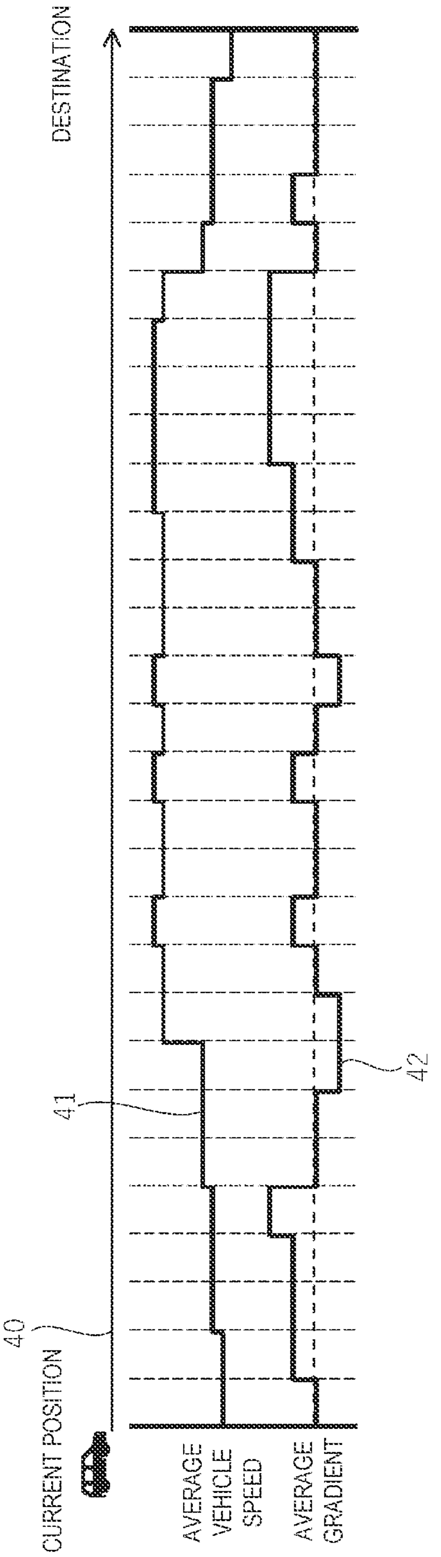
FIG. 4 is a diagram showing an example of an average vehicle speed and an average gradient acquired by a management ECU shown in FIG. 1.

In FIG. 4, a scheduled traveling route 40 is a scheduled traveling route from a current position of the electrical vehicle 1 to a destination. The scheduled traveling route 40 is divided into 29 traveling sections as divided by broken lines in FIG. 4. An average vehicle speed 41 is an average vehicle speed of each traveling section in the scheduled traveling route 40. An average gradient 42 is an average gradient of the traveling sections in the scheduled traveling route 40.

The management ECU 125 can acquire information on the average vehicle speed 41 and the average gradient 42 from the navigation system 131, for example. The management ECU 125 creates a travelling plan in which one of a plurality of travelling modes is assigned to each traveling section included in the scheduled traveling route based on the acquired information.

<Processing by Management ECU 125>

For example, the management ECU 125 creates a travelling plan based on the scheduled traveling route received from the navigation system 131, and performs control to switch a travelling mode of the electrical vehicle 1 traveling along the scheduled traveling route in accordance with the created travelling plan. While the electrical vehicle 1 is traveling along the scheduled traveling route, the management ECU 125 executes, for example, processing shown in FIG. 5.

Figure 5:
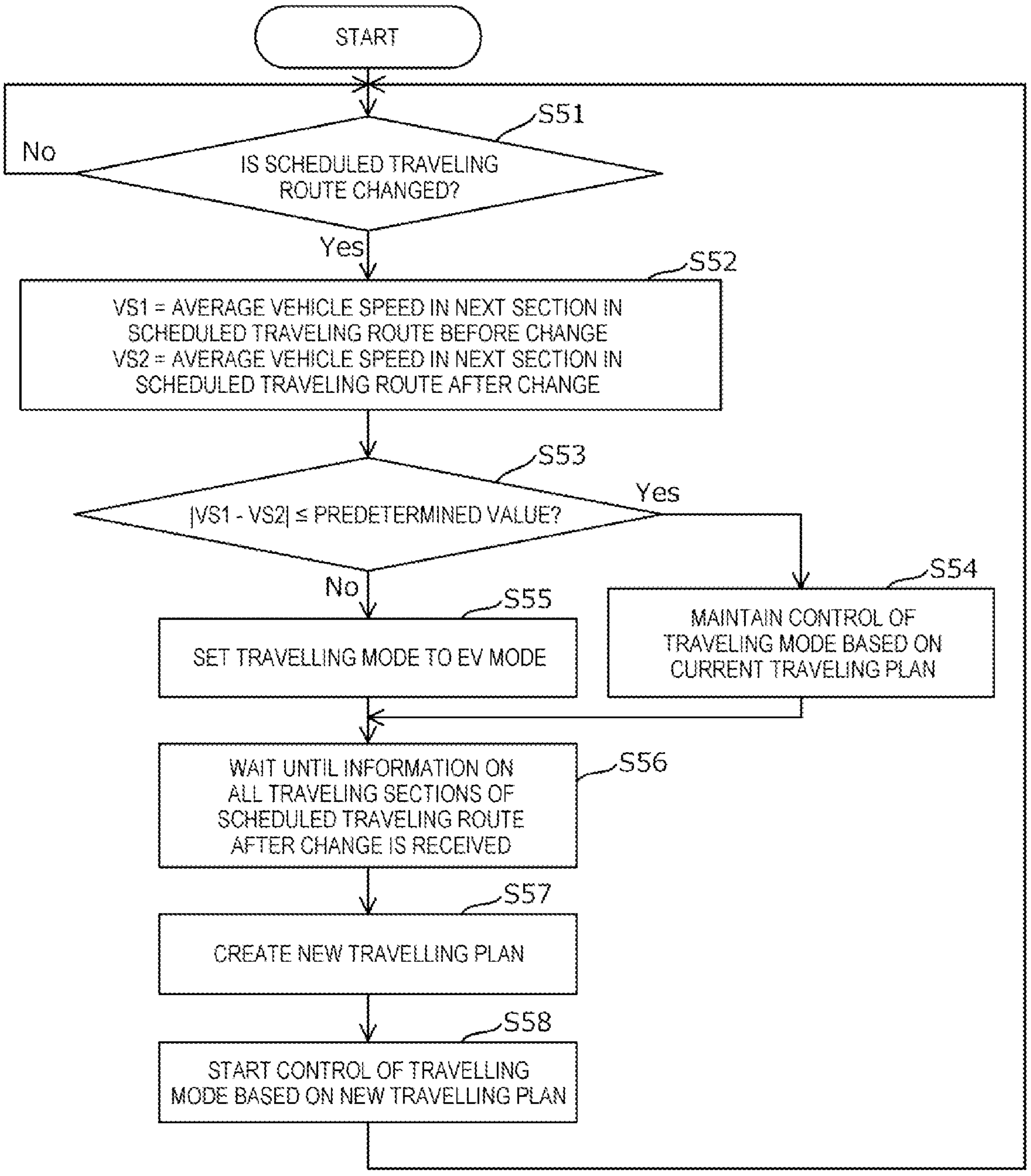
FIG. 5 is a flowchart showing an example of processing performed by the management ECU shown in FIG. 1.

As shown in FIG. 5, first, the management ECU 125 determines whether the scheduled traveling route is changed (step S51), and waits until the scheduled traveling route is changed (step S51: No loop). The determination in step S51 can be made based on, for example, information from the navigation system 131 to the management ECU 125.

For example, the navigation system 131 also re-searches for an optimal travelling route from the current position to the destination at a constant cycle (for example, a cycle of several minutes) when the electrical vehicle 1 is traveling along the scheduled traveling route. When the re-searched travelling route is different from the current scheduled traveling route, the navigation system 131 sets the re-searched travelling route as a new scheduled traveling route and transmits information on the new scheduled traveling route to the management ECU 125. When the navigation system 131 detects that the electrical vehicle 1 has deviated from the scheduled traveling route, the navigation system 131 also re-searches for an optimal travelling route, sets the re-searched travelling route as a new scheduled traveling route, and transmits information on the new scheduled traveling route to the management ECU 125.

When the navigation system 131 transmits information on the new scheduled traveling route to the management ECU 125, the navigation system 131 transmits the information to the management ECU 125 in order from information on a traveling section closer to the current position of the electrical vehicle 1 among the traveling sections of the scheduled traveling route. The management ECU 125 determines that the scheduled traveling route is changed when receiving information on the new scheduled traveling route (specifically, a traveling section closest to the current position in the new scheduled traveling route) from the navigation system 131.

In step S51, when the scheduled traveling route is changed (step S51: Yes), the management ECU 125 acquires an average vehicle speed of a section next to a section in which the electrical vehicle 1 is currently located in the scheduled traveling route before the change as VS1, and acquires an average vehicle speed of a section next to a section in which the electrical vehicle 1 is currently located in the scheduled travelling route after the change as VS2 (step S52).

The average vehicle speeds VS1 and VS2 are examples of an estimated value of the vehicle speed. The estimated value of the vehicle speed is an example of first attribute information and second attribute information in the present invention. The estimated value of the vehicle speed may be an average value of the legal speed limits of a section, an average value of vehicle speeds of the other vehicles traveling in the section, or an estimated value of the vehicle speed calculated by using the legal speed limits and the vehicle speeds of the other vehicles in combination.

Next, the management ECU 125 determines whether |VS1−VS2|, which is a difference between the average vehicle speeds VS1 and VS2 acquired in step S52, is equal to or less than a predetermined value (step S53).

In step S53, when |VS1−VS2| is equal to or less than the predetermined value (step S53: Yes), the management ECU 125 maintains the control of the traveling mode of the electrical vehicle 1 based on the current traveling plan created based on the scheduled traveling route before the change (step S54), and shifts the processing to step S56.

In step S53, when |VS1−VS2| exceeds the predetermined value (step S53: No), the management ECU 125 withdraws the current travelling plan created based on the scheduled traveling route before the change. That is, the management ECU 125 sets, for example, a traveling mode of the electrical vehicle 1 to the EV mode regardless of the current traveling plan (step S55).

Next, the management ECU 125 waits until information on all the traveling sections of the scheduled traveling route after the change is received from the navigation system 131 (step S56). Next, the management ECU 125 creates a new travelling plan based on the scheduled traveling route after the change based on the received information on the scheduled traveling route (step S57). Next, the management ECU 125 starts control of the traveling mode of the electrical vehicle 1 based on the created new traveling plan (step S58), and the processing returns to step S51.

Figure 6:
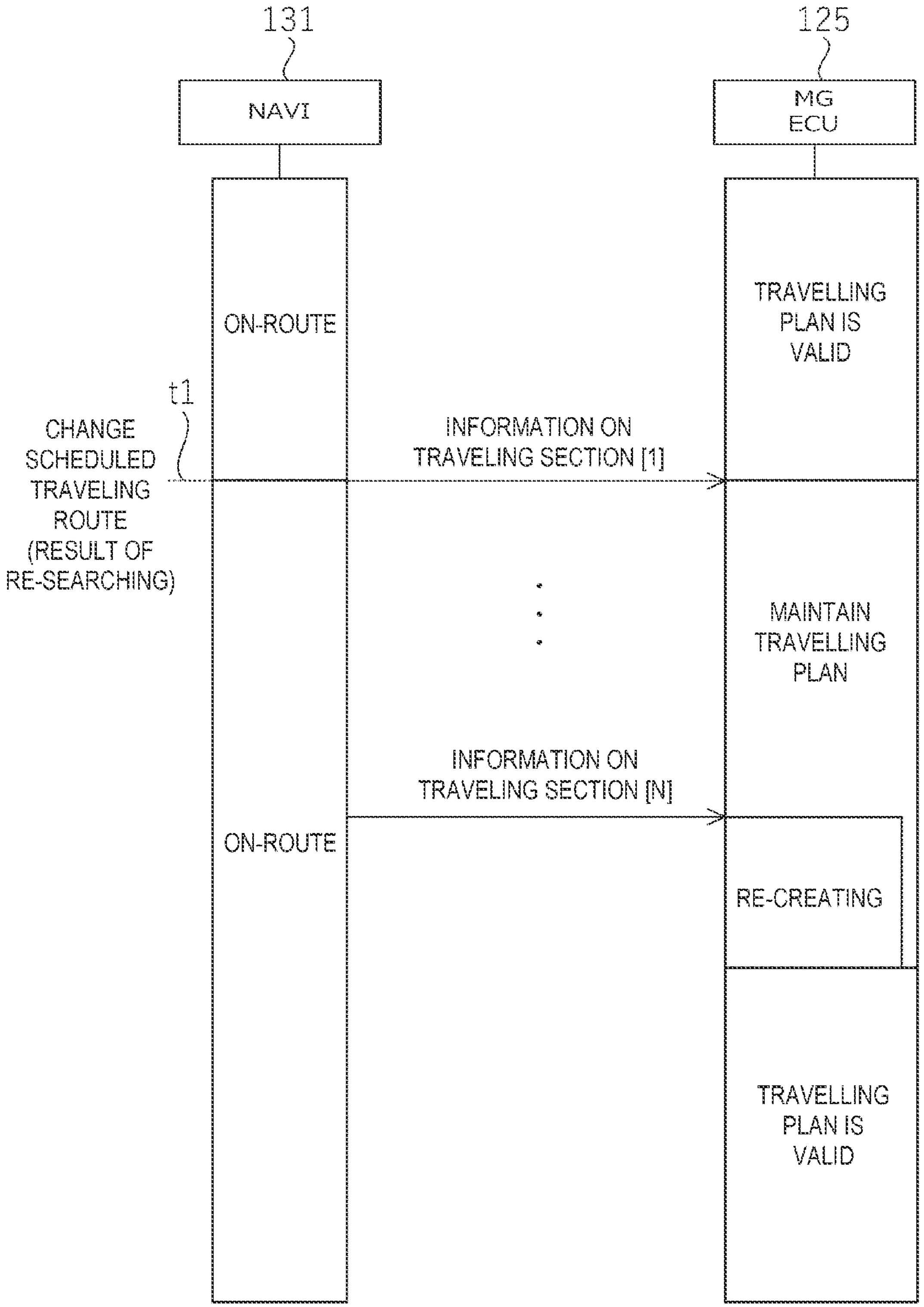
FIG. 6 is a flowchart showing an example of travelling mode control performed by the management ECU shown in FIG. 1.

FIG. 6 shows a case where the navigation system 131 changes the scheduled traveling route at a time point t1 by re-searching for a scheduled traveling route during the travelling (on-route). For example, the scheduled traveling routes before and after the change are different routes at a distance from the current position, and are the same route in a vicinity of the current position.

In this case, the navigation system 131 transmits, in ascending order of distance from the current position, information on each traveling section of the scheduled traveling route after the change to the management ECU 125. In this example, the scheduled traveling route after the change includes N traveling sections from a traveling section [1] to a traveling section [N] in ascending order of distance from the current position. The information on sections from the traveling section [1] to the traveling section [N], which is transmitted from the navigation system 131 to the management ECU 125, includes vehicle speed information indicating the average vehicle speed 41 of each traveling section, gradient information indicating the average gradient 42, and the like.

The management ECU 125 controls the travelling mode of the electrical vehicle 1 based on the travelling plan created based on the scheduled traveling route before the change until the information on the traveling section [1] is received from the navigation system 131 (travelling plan being valid).

When the management ECU 125 receives the information on the traveling section [1] from the navigation system 131, the management ECU 125 compares the average vehicle speed VS1 indicated by the vehicle speed information included in the received information on the traveling section [1] with the average vehicle speed VS2 of a traveling section immediately after the current position in the scheduled traveling route before the change.

In this example, since the scheduled traveling routes before and after the change are the same route in the vicinity of the current position, there is no large difference between the average vehicle speed VS1 and the average vehicle speed VS2. Therefore, the management ECU 125 maintains the control of the travelling mode of the electrical vehicle 1 based on the travelling plan created based on the scheduled traveling route before the change (maintaining travelling plan).

In addition, when the management ECU 125 receives, from the navigation system 131, all the information on the scheduled traveling route after the change, that is, information on travelling sections from the traveling section [1] to the traveling section [N], the management ECU 125 re-creates a travelling plan based on the received information (for example, the average vehicle speed or the average gradient). Then, when the management ECU 125 re-creates the travelling plan, the management ECU 125 starts control of the travelling mode of the electrical vehicle 1 based on the re-created travelling plan (travelling plan being valid).

Figure 7:
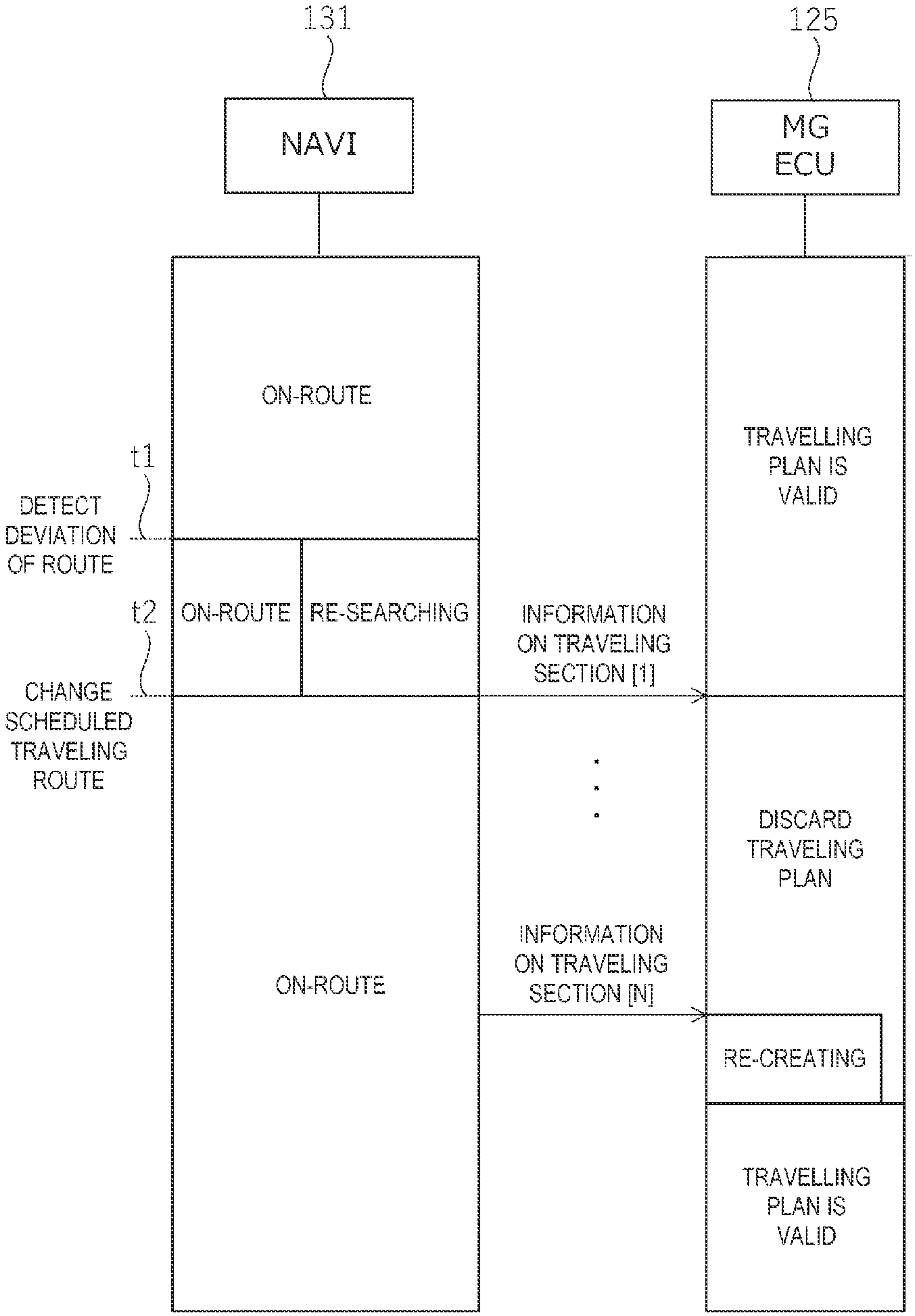
FIG. 7 is a flowchart showing another example of the travelling mode control performed by the management ECU shown in FIG. 1.

FIG. 7 shows a case where the electrical vehicle 1 intentionally deviates from the scheduled traveling route at a time point t1, the navigation system 131 having detected the above deviation of the electrical vehicle 1 performs a re-search, and the scheduled traveling route is changed at a time point t2.

Also in this case, as in the example of FIG. 6, the navigation system 131 transmits the information on the traveling sections of the scheduled traveling route after change to the management ECU 125 in ascending order of distance from the current position.

The management ECU 125 controls the travelling mode of the electrical vehicle 1 based on the travelling plan created based on the scheduled traveling route before the change until the information on the traveling section [1] is received from the navigation system 131 (travelling plan being valid).

When the management ECU 125 receives the information on the traveling section [1] from the navigation system 131, the management ECU 125 compares the average vehicle speed VS1 indicated by the vehicle speed information included in the received information on the traveling section [1] with the average vehicle speed VS2 of a traveling section immediately after the current position in the scheduled traveling route before the change.

In this example, since the electrical vehicle 1 deviates from the scheduled traveling route before the change, a large difference occurs between the average vehicle speed VS1 and the average vehicle speed VS2. Therefore, the management ECU 125 sets the traveling mode of the electrical vehicle 1 to the EV mode at all times regardless of the scheduled traveling route before the change (discarding traveling plan).

In addition, when the management ECU 125 receives, from the navigation system 131, all the information on the scheduled traveling route after the change, that is, information on travelling sections from the traveling section [1] to the traveling section [N], the management ECU 125 re-creates a travelling plan based on the received information (for example, the average vehicle speed or the average gradient). Then, when the management ECU 125 re-creates the travelling plan, the management ECU 125 starts control of the travelling mode of the electrical vehicle 1 based on the re-created travelling plan (travelling plan being valid).

The navigation system 131 may notify the management ECU 125 that the route deviation has been detected at the time point t1. Also in this case, the management ECU 125 receives the information on the traveling section [1] at the time point t2, compares the average vehicle speeds VS1 and VS2, and maintains or discards the travelling plan.

Alternatively, the navigation system 131 may perform control to maintain the travelling plan created based on the scheduled traveling route before the change in a period from when the navigation system 131 notifies the navigation system 131 that the route deviation has been detected at the time point t1 to when the navigation system 131 receives the information on the traveling section [1] at the time point t2. In this way, the traveling plan created based on the scheduled traveling route before the change is maintained during the period in which it is uncertain whether the electrical vehicle 1 has deviated from the scheduled traveling route, so that the fluttering of the control can be prevented.

As described above, according to the management ECU 125 of the electric vehicle 1 in the present embodiment, even if the scheduled traveling route is changed, it is possible to maintain the control of the travelling mode based on the travelling plan created based on the scheduled traveling route before the change as long as there is no large change in an attribute of a section next to the section in which the electrical vehicle 1 is located. As a result, when a route to be changed is far from the current position and the vehicle is currently traveling along the scheduled traveling route, it is possible to prevent the traveling mode from being forcibly switched to the EV mode. Therefore, it is possible to prevent the electric power of the storage battery 101 from being excessively consumed and prevent the operation of the internal combustion engine 109 from being suddenly changed to give a sense of discomfort to the occupant.

As described above, according to the control device for the electrical vehicle of the present embodiment, it is possible to prevent the power consumption of the storage battery and prevent the sense of discomfort of the occupant.

Although an embodiment of the present invention has been described above, the present invention is not limited to the above-described embodiment, and modifications, improvements, and the like can be made as appropriate.

For example, the configuration in which the control device of the present invention is applied to the management ECU 125 has been described, and at least a part of the control device of the present invention may be applied to a device other than the management ECU 125. Here, the device other than the management ECU 125 may be a device (for example, the navigation system 131) of the electrical vehicle 1, or may be a device (for example, the server 133) outside the electrical vehicle 1.

An example in which the navigation system 131 acquires information on roads such as a road type and a legal speed limit from the server 133 has been described in the above embodiment, and these pieces of information may be stored in the navigation system 131 in advance. In this case, for example, the navigation system 131 may read required information in accordance with a destination input by a user from information stored in the navigation system 131 in advance. That is, in this case, the server 133 or the communication function of the navigation system 131 for communicating with the server 133 may not be provided.

The EV mode has been described as an example of a travelling mode with high power consumption, but the travelling mode with high power consumption is not limited to the EV mode as long as the usage amount of electric power of the storage battery 101 is larger than that in the other travelling modes. For example, the travelling mode with high power consumption may be a mode in the series mode, in which the electric power from the storage battery 101 is used as the assist electric power, or may be a mode in the engine direct connection mode, in which the driving force of the electric motor 107 driven by the supply of electric power from the storage battery 101 is used.

The estimated value of the vehicle speed of the section has been described as an example of the first attribute information and the second attribute information of the section, but the first attribute information and the second attribute information of the section is not limited to this example. For example, the first attribute information and the second attribute information of the section may be an estimated value of a gradient of the section.

In addition, the first attribute information and the second attribute information of the section may be road types (for example, general roads and expressways) of the section. In this case, when a road type acquired as the first attribute information is different from a road type acquired as the second attribute information, the management ECU 125 maintains the control of the traveling mode based on the current traveling plan. When the road type acquired as the first attribute information and the road type acquired as the second attribute information are the same, the management ECU 125 discards the current travelling plan and forcibly sets the travelling mode to the EV mode or the like.

In addition, the configuration in which the attribute information (for example, the estimated value of the vehicle speed) of the section next to the section in which the electric vehicle 1 is located is used as the first attribute information and the second attribute information has been described in the embodiment, but the first attribute information and the second attribute information are not limited to this example and may be attribute information of at least one section located within a predetermined distance from the electrical vehicle 1 and in the vehicle traveling direction. For example, in consideration of the possibility of crossing the section during the determination depending on the traveling of the electrical vehicle 1, the control device for the electrical vehicle may determine the maintenance of the traveling plan using the attribute information of the section next to the next section of the section in which the electric vehicle 1 is located. The control device for the electrical vehicle may determine the maintenance of the traveling plan by acquiring attribute information of a plurality of sections among the sections within the predetermined distance, calculating an average value of the attribute information of the plurality of sections, and comparing the average values before and after changing the scheduled traveling route. In addition, the control device for the electrical vehicle may determine the maintenance of the travelling plan by comparing attribute information of a plurality of sections among the sections within the predetermined distance before and after changing the scheduled traveling route.

In the present specification, at least the following matters are described. Although the corresponding constituent elements or the like in the above embodiment are shown in parentheses, the present invention is not limited thereto.

(1) A control device (management ECU 125) for an electrical vehicle (electrical vehicle 1) that includes an internal combustion engine (internal combustion engine 109), a storage battery (storage battery 101), and an electric motor (electric motor 107) driven by supply of electric power from the storage battery, and travels in a plurality of traveling modes in which the usage amounts of electric power of the storage battery are different, the control device (management ECU 125) comprising a control unit (management ECU 125) configured to create a travelling plan in which any one of the plurality of travelling modes is assigned to each traveling section of a scheduled traveling route (scheduled traveling route 40) from a current position of the electrical vehicle to a destination, and control the travelling mode of the electrical vehicle based on the created travelling plan, wherein, when the scheduled traveling route is changed during travelling of the electrical vehicle, the control unit maintains control of the travelling mode based on the travelling plan created based on the scheduled traveling route before the change, in accordance with a result of comparison between first attribute information and second attribute information, the first attribute information indicating an attribute of at least one section, which is located within a predetermined distance from a section in which the electrical vehicle is located and located in a vehicle travelling direction, of the scheduled traveling route before the change, the second attribute information indicating an attribute of at least one section, which is located within a predetermined distance from a section in which the electrical vehicle is located and located in a vehicle travelling direction, of the scheduled traveling route after the change.

According to (1), even if the scheduled traveling route is changed, it is possible to maintain the control of the travelling mode based on the travelling plan created based on the scheduled traveling route before the change as long as there is no large change in the attribute of at least one section located within the predetermined distance from the section in which the electrical vehicle is located and located in the vehicle traveling direction. As a result, when a route to be changed is far from the current position and the electrical vehicle is currently traveling along the scheduled traveling route, it is possible to prevent the traveling mode from being forcibly switched to a traveling mode with high power consumption (for example, the EV mode). Therefore, it is possible to prevent the electric power of the storage battery from being excessively consumed and prevent the operation of the internal combustion engine from being suddenly changed to give a sense of discomfort to the occupant.

(2) The control device according to (1), wherein the control unit maintains the control of the travelling mode based on the travelling plan created based on the scheduled traveling route before the change when a difference between an estimated value of a vehicle speed (average vehicle speed VS1) in at least one section, which is located within a predetermined distance from a section in which the electrical vehicle is located and located in a vehicle traveling direction, of the scheduled traveling route before the change and an estimated value of a vehicle speed (average vehicle speed VS2) in at least one section, which is located within a predetermined distance from a section in which the electrical vehicle is located and located in the vehicle traveling direction, of the scheduled traveling route after the change is equal to or less than a predetermined value.

According to (2), even if the scheduled traveling route is changed, it is possible to maintain the control of the travelling mode based on the travelling plan created based on the scheduled traveling route before the change as long as there is no large change in the estimated value of the vehicle speed in at least one section located within the predetermined distance from the section in which the electrical vehicle is located and located in the vehicle traveling direction.

(3) The control device according to (2), wherein the control unit controls the travelling mode regardless of the traveling plan created based on the scheduled traveling route before the change when the difference exceeds the predetermined value.

According to (3), when the scheduled traveling route is changed and there is a large change in the estimated value of the vehicle speed in at least one section located within the predetermined distance from the section in which the electrical vehicle is located and located in the vehicle traveling direction, it is possible to control the travelling mode regardless of the travelling plan created based on the scheduled travelling route before the change. As a result, when the electrical vehicle actually deviates from the scheduled travelling route, the travelling mode is forcibly switched to the travelling mode with high power consumption (for example, EV mode), and it is possible to prevent the occurrence of an unused state in the electric power storage amount of the storage battery 101 due to the deviation of the electrical vehicle from the scheduled travelling route.

(4) The control device according to (3), wherein the plurality of traveling modes include a first traveling mode and a second traveling mode in which a usage amount of electric power of the storage battery is smaller than that in the first traveling mode, and the control unit sets the traveling mode of the electrical vehicle to the first traveling mode when the difference exceeds the predetermined value.

According to (4), when the scheduled traveling route is changed and there is a large change in the estimated value of the vehicle speed in at least one section located within the predetermined distance from the section in which the electrical vehicle is located and located in the vehicle traveling direction, the travelling mode can be forcibly switched to the travelling mode with high power consumption.

(5) The control device according to any one of (1) to (4), wherein the control unit acquires information on each traveling section of the scheduled traveling route in order from information on a section closest to the electrical vehicle, and creates the traveling plan after acquiring all the information on each traveling section of the scheduled traveling route.

As described in (5), even in a configuration in which the information on each traveling section of the scheduled traveling route is acquired in order from the information on the section closest to the electrical vehicle and it takes time to acquire all the information on each traveling section of the scheduled traveling route after the change, it is possible to determine whether to maintain the control of the traveling mode based on the traveling plan created based on the scheduled traveling route before the change, at the time point of acquiring the attribute information on at least one section, which is located within the predetermined distance from the section in which the electrical vehicle is located and located in the vehicle traveling direction, of the scheduled traveling route after the change, that is, before acquiring all the information on each traveling section of the scheduled traveling route after the change.

(6) A control method for an electrical vehicle that includes an internal combustion engine, a storage battery, and an electric motor driven by supply of electric power from the storage battery, and travels in a plurality of traveling modes in which the usage amounts of electric power of the storage battery are different, the control method comprising a control step of creating a travelling plan in which any one of the plurality of travelling modes is assigned to each traveling section of a scheduled traveling route from a current position of the electrical vehicle to a destination, and controlling the travelling mode of the electrical vehicle based on the created travelling plan, wherein, when the scheduled traveling route is changed during travelling of the electrical vehicle, control of the travelling mode based on the travelling plan created based on the scheduled traveling route before the change is maintained in the control step in accordance with a result of comparison between first attribute information and second attribute information, the first attribute information indicating an attribute of at least one section, which is located within a predetermined distance from a section in which the electrical vehicle is located and located in a vehicle travelling direction, of the scheduled traveling route before the change, the second attribute information indicating an attribute of at least one section, which is located within a predetermined distance from a section in which the electrical vehicle is located and located in a vehicle travelling direction, of the scheduled traveling route after the change.

According to (6), similarly to (1), the power consumption of the storage battery can be prevented, and the sense of discomfort of the occupant can be prevented.

(7) An electrical vehicle, which includes an internal combustion engine, a storage battery, and an electric motor driven by supply of electric power from the storage battery, and travels in a plurality of traveling modes in which the usage amounts of electric power of the storage battery are different, the electrical vehicle comprising a control unit configured to create a travelling plan in which any one of the plurality of travelling modes is assigned to each traveling section of a scheduled traveling route from a current position of the electrical vehicle to a destination, and controls the travelling mode of the electrical vehicle based on the created travelling plan, wherein, when the scheduled traveling route is changed during travelling of the electrical vehicle, the control unit maintains control of the travelling mode based on the travelling plan created based on the scheduled traveling route before the change, in accordance with a result of comparison between first attribute information and second attribute information, the first attribute information indicating an attribute of at least one section, which is located within a predetermined distance from a section in which the electrical vehicle is located and located in a vehicle travelling direction, of the scheduled traveling route before the change, the second attribute information indicating an attribute of at least one section, which is located within a predetermined distance from a section in which the electrical vehicle is located and located in a vehicle travelling direction, of the scheduled traveling route after the change.

According to (7), similarly to (1), the power consumption of the storage battery can be prevented, and the sense of discomfort of the occupant can be prevented.

What is claimed is:

1. A control device for an electrical vehicle that includes an internal combustion engine, a storage battery, and an electric motor driven by supply of electric power from the storage battery, and travels in a plurality of traveling modes in which usage amounts of electric power of the storage battery are different, the control device comprising a control unit configured to create a travelling plan in which any one of the plurality of travelling modes is assigned to each traveling section of a scheduled traveling route from a current position of the electrical vehicle to a destination, and controls the travelling mode of the electrical vehicle based on the created travelling plan, wherein, when the scheduled traveling route is changed during travelling of the electrical vehicle, the control unit maintains control of the travelling mode based on the travelling plan created based on the scheduled traveling route before the change, in accordance with a result of comparison between first attribute information and second attribute information, the first attribute information indicating an attribute of at least one section of the scheduled traveling route before the change, the second attribute information indicating an attribute of at least one section of the scheduled traveling route after the change, the at least one section of the scheduled traveling route before the change being located within a predetermined distance from a section in which the electrical vehicle is located and being located in a vehicle travelling direction, the at least one section of the scheduled traveling route after the change being located within the predetermined distance from the section in which the electrical vehicle is located and being located in the vehicle travelling direction, wherein even if the scheduled traveling route is changed, the control unit is configured to maintain the control of the travelling mode based on the travelling plan created based on the scheduled traveling route before the change as long as a change in an attribute of a section next to the section in which the electrical vehicle is located is less than a predetermined value, wherein even if the scheduled traveling route is changed, the control unit is configured to maintain the control of the travelling mode based on the travelling plan created based on the scheduled traveling route before the change as long as there is no large change in an attribute of a section next to the section in which the electrical vehicle is located, and wherein the control unit is implemented via at least one processor.

2. The control device according to claim 1, wherein the control unit is further configured to maintain the control of the travelling mode based on the travelling plan created based on the scheduled traveling route before the change when a difference between an estimated value of a vehicle speed in at least one section, which is located within a predetermined distance from a section in which the electrical vehicle is located and located in the vehicle traveling direction, of the scheduled traveling route before the change and an estimated value of a vehicle speed in at least one section, which is located within a predetermined distance from a section in which the electrical vehicle is located and located in the vehicle traveling direction, of the scheduled traveling route after the change is equal to or less than a predetermined value.

3. The control device according to claim 2, wherein the control unit is further configured to control the travelling mode regardless of the traveling plan created based on the scheduled traveling route before the change when the difference exceeds the predetermined value.

4. The control device according to claim 3, wherein the plurality of traveling modes include a first traveling mode and a second traveling mode in which a usage amount of electric power of the storage battery is smaller than that in the first traveling mode, and the control unit is further configured to set the traveling mode of the electrical vehicle to the first traveling mode when the difference exceeds the predetermined value.

5. The control device according to claim 1, wherein the control unit is further configured to acquire information on each traveling section of the scheduled traveling route in order from information on a section closest to the electrical vehicle, and creates the traveling plan after acquiring all the information on each traveling section of the scheduled traveling route.

6. A control method for an electrical vehicle that includes an internal combustion engine, a storage battery, and an electric motor driven by supply of electric power from the storage battery, and travels in a plurality of traveling modes in which usage amounts of electric power of the storage battery are different, the control method comprising creating a travelling plan in which any one of the plurality of travelling modes is assigned to each traveling section of a scheduled traveling route from a current position of the electrical vehicle to a destination, and controlling the travelling mode of the electrical vehicle based on the created travelling plan, wherein, when the scheduled traveling route is changed during travelling of the electrical vehicle, control of the travelling mode based on the travelling plan created based on the scheduled traveling route before the change is maintained in accordance with a result of comparison between first attribute information and second attribute information, the first attribute information indicating an attribute of at least one section of the scheduled traveling route before the change, the second attribute information indicating an attribute of at least one section of the scheduled traveling route after the change, the at least one section of the scheduled traveling route before the change being located within a predetermined distance from a section in which the electrical vehicle is located and being located in a vehicle travelling direction, the at least one section of the scheduled traveling route after the change being located within the predetermined distance from the section in which the electrical vehicle is located and being located in the vehicle travelling direction, wherein even if the scheduled traveling route is changed, the controlling of the travelling mode is maintained based on the travelling plan created based on the travelling plan created based on the scheduled traveling route before the change as long as a change in an attribute of a section next to the section in which the electrical vehicle is located is less than a predetermined value, and wherein even if the scheduled traveling route is changed, the controlling of the travelling mode is maintained based on the travelling plan created based on the scheduled traveling route before the change as long as there is no large change in an attribute of a section next to the section in which the electrical vehicle is located.

7. An electrical vehicle, which includes an internal combustion engine, a storage battery, and an electric motor driven by supply of electric power from the storage battery, and travels in a plurality of traveling modes in which usage amounts of electric power of the storage battery are different, the electrical vehicle comprising a control unit configured to create a travelling plan in which any one of the plurality of travelling modes is assigned to each traveling section of a scheduled traveling route from a current position of the electrical vehicle to a destination, and controls the travelling mode of the electrical vehicle based on the created travelling plan, wherein, when the scheduled traveling route is changed during travelling of the electrical vehicle, the control unit maintains control of the travelling mode based on the travelling plan created based on the scheduled traveling route before the change, in accordance with a result of comparison between first attribute information and second attribute information, the first attribute information indicating an attribute of at least one section of the scheduled traveling route before the change, the second attribute information indicating an attribute of at least one section of the scheduled traveling route after the change, the at least one section of the scheduled traveling route before the change being located within a predetermined distance from a section in which the electrical vehicle is located and being located in a vehicle travelling direction, the at least one section of the scheduled traveling route after the change being located within the predetermined distance from the section in which the electrical vehicle is located and being located in the vehicle travelling direction, wherein even if the scheduled traveling route is changed, the control unit is configured to maintain the control of the travelling mode based on the travelling plan created based on the scheduled traveling route before the change as long as a change in an attribute of a section next to the section in which the electrical vehicle is located is less than a predetermined value, wherein even if the scheduled traveling route is changed, the control unit is configured to maintain the control of the travelling mode based on the travelling plan created based on the scheduled traveling route before the change as long as there is no large change in an attribute of a section next to the section in which the electrical vehicle is located, and wherein the control unit is implemented via at least one processor.

* * * * *